No. 872,638.

PATENTED DEC. 3, 1907.

W. C. BERNER.
DEVICE FOR PROPELLING VEHICLES.
APPLICATION FILED SEPT. 27, 1906.

2 SHEETS—SHEET 1.

Witnesses:
Ed B. Godfrey
George L. Godfrey

Inventor:
William C. Berner

No. 872,638. PATENTED DEC. 3, 1907.
W. C. BERNER.
DEVICE FOR PROPELLING VEHICLES.
APPLICATION FILED SEPT. 27, 1906.
2 SHEETS—SHEET 2.
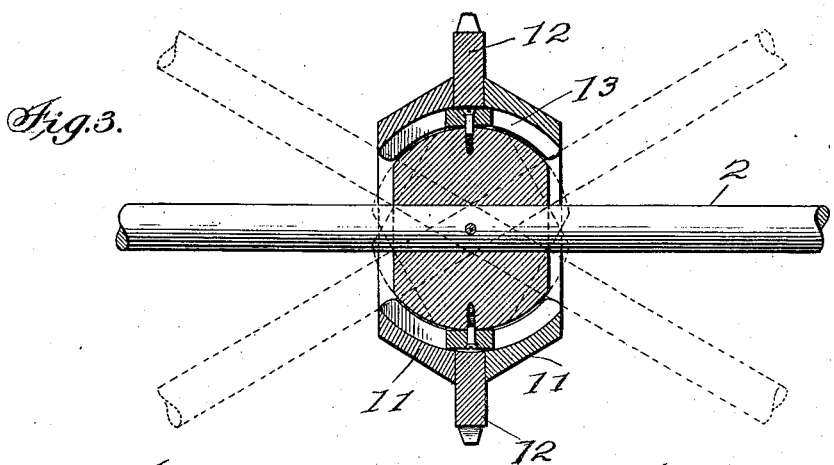
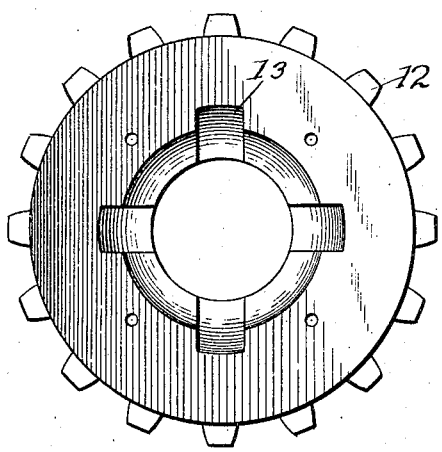
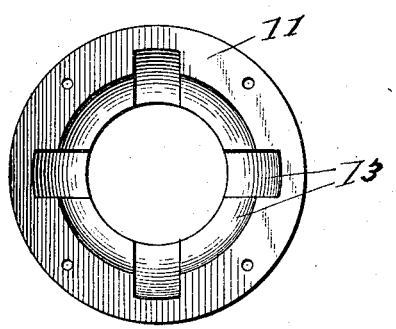
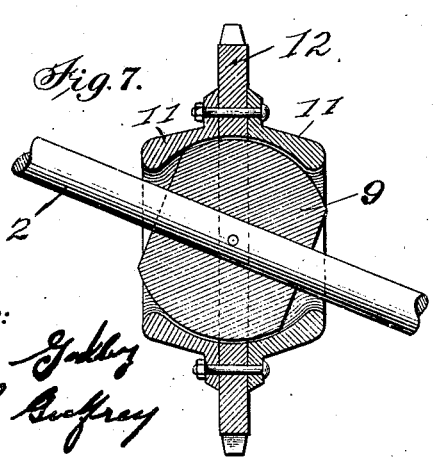
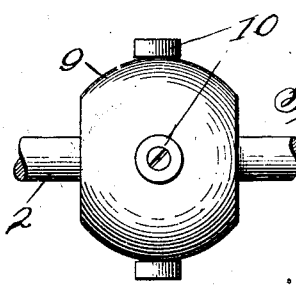
Witnesses:
Ed. B. Godkey
George L. Godfrey
Inventor:
William C. Berner

UNITED STATES PATENT OFFICE.

WILLIAM C. BERNER, OF EL RENO, OKLAHOMA TERRITORY.

DEVICE FOR PROPELLING VEHICLES.

No. 872,638.      Specification of Letters Patent.      Patented Dec. 3, 1907.

Application filed September 27, 1906. Serial No. 336,518.

*To all whom it may concern:*

Be it known that I, WILLIAM C. BERNER, a citizen of the United States, residing at El Reno, in Canadian county, Oklahoma Territory, have invented certain new and useful Improvements in Vehicle-Propelling Devices, of which the following is a full, clear, and exact description.

This invention has for its object an improved construction of vehicle propulsion means or transmission gearing whereby traction engines, and all self-propelled vehicles of any character may be driven by power applied to the front wheels, without impairing the steering function of such wheels, and the invention consists in certain constructions and arrangements of the parts that I shall hereinafter describe and claim.

Figure 1:
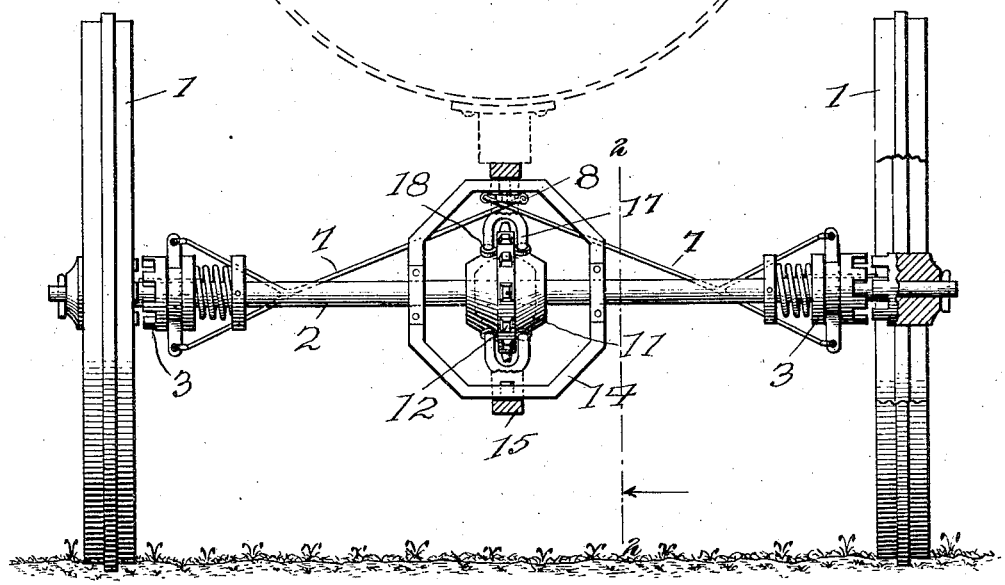
Figure 2:
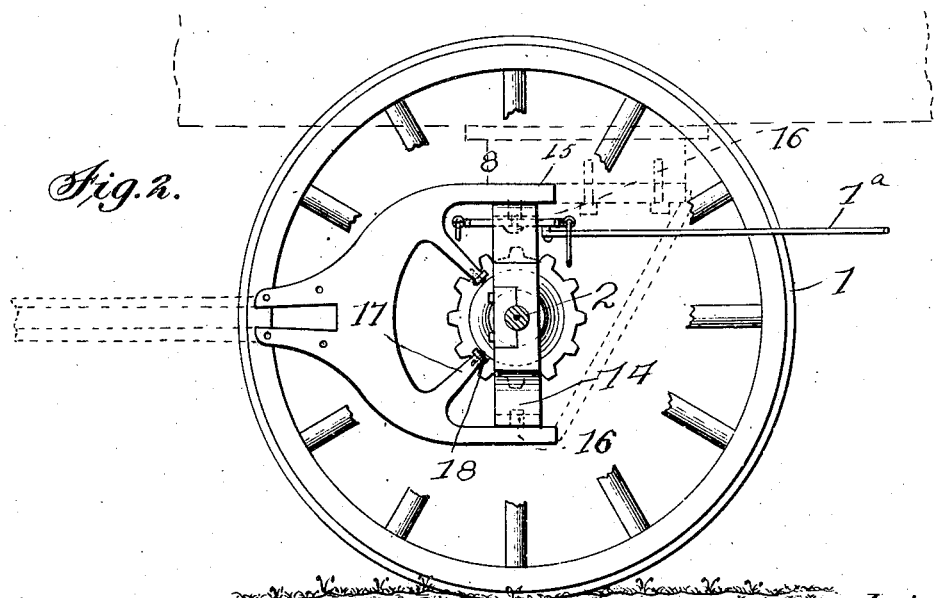

For a full description of the invention and the merits thereof and also to acquire a knowledge of the details of construction of the means for effecting the result, reference is to be had to the following description and accompanying drawings, in which:

Figure 1 is an end elevation of a pair of front vehicle wheels equipped with the improvements of my invention; Fig. 2 is a side elevation thereof, a portion of one wheel being broken away to illustrate the parts back of it. Fig. 3 is a detail sectional view on an enlarged scale, illustrating the swivel connection between the driving sprocket and front axle whereby the former may maintain a true position with respect to the actuating mechanism, while at the same time permitting the front axle to turn to the left or to the right; Figs. 4 and 5 are detail face views of said sprocket and a portion of its swivel connection; Fig. 6 is a detail view of the round or ball bearing for the sprocket wheel and its hub; and, Fig. 7 is a detail sectional view of the parts illustrated in Fig. 3.

Corresponding and like parts are referred to in the following description and indicated in all the views of the drawings by the same reference characters.

Referring to the drawings, the numeral 1 designates the front wheels of a vehicle, said wheels being preferably mounted to turn loose on the front steering axle 2 and being arranged for coupling engagement with said axle by means of oppositely disposed clutches 3 spring pressed outwardly as shown and retracted by means of link rods 7 connected by universal joints to the rocking lever 8 which may be manipulated in any desired manner.

In the present instance I have shown for the purpose of manipulating the rocking lever 8 to move the link rods 7 inwardly, or outwardly, an actuating rod 7ª which may extend rearwardly to the operator and hence by pulling upon the rod 7ª, the rocking lever 8 may be turned in one direction, or the other to draw the spring pressed clutches 3 inwardly or permit them to move outwardly into engagement with the complemental clutch members on the wheels 1. It will, of course, be understood that the clutches are splined or otherwise slidingly secured to the axle while the wheels 1 are journaled loose on the axle. In Fig. 1 of the drawings, the clutches are shown in their retracted position, but it is to be understood that under working conditions, they will be engaged with the clutch members of the wheels.

At its middle the front steering axle 2 has rigidly secured thereto a sphere shaped block 9 which is preferably provided at four equidistant points with anti-friction rollers 10. The block 9 is mounted within concave hub plates 11 of the sprocket wheel 12, said hub plates being formed with curved slots 13 in which the rollers 10 work. The sprocket wheel 12 may be connected by a chain to the power supplying mechanism (not shown), and it is manifest that I may employ a belt wheel or other equivalent element for the said sprocket wheel 12.

A frame 14 is disposed vertically at the middle of the axle 2, the said axle passing through the side members of said frame as shown, and hounds 15 are pivotally connected to the frame by means of studs 16 or the like. The hounds 15 are preferably provided with inwardly extending arms 17 that carry rollers 18 bearing on opposite sides of the sprocket wheel 12, so as to maintain said wheel at all times in true relation with respect to the actuating mechanism, no matter whether the axle 2 turns toward the left or right. The axle may be turned to steer the vehicle in any desired manner, and I have, therefore, not shown any specific means for accomplishing this end.

Having thus described the invention, what is claimed as new is:

1. The combination with the steering axle of a vehicle, of a rounded block secured thereto, a drive wheel provided with curved hub plates inclosing said block and having a swivel movement thereon, a frame mounted on said axle, a hound with which said frame has a relatively pivotal movement, and arms extending inwardly from said hounds on opposite sides of said drive wheel.

2. The combination with the steering axle of a vehicle, of a rounded block secured thereto, a drive wheel mounted on said block, the block and drive wheel having a relative swivel movement, a vertically disposed frame mounted on said axle, and a hound with which said frame has pivotal connection to turn about a vertical axis, the said hound being formed with inwardly extending fingers, said fingers carrying at their extremities rollers bearing on opposite sides of said drive wheel.

WILLIAM C. BERNER.

We the undersigned personally know that WILLIAM C. BERNER who signed the above specification is the inventor of the device for the propelling of vehicles, traction engines, etc.

GEORGE L. GODFREY.
ED. B. GODFREY.